United States Patent
Tomosue

Patent Number: 5,415,084
Date of Patent: May 16, 1995

[54] YOLK CUP FOR EGG BREAKING APPARATUS

[75] Inventor: Shigeo Tomosue, Tsuyama, Japan

[73] Assignee: Kyowa Machinery Co., Ltd., Okayama, Japan

[21] Appl. No.: 267,745

[22] Filed: Jul. 5, 1994

[30] Foreign Application Priority Data

Jul. 30, 1993 [JP] Japan .................. 5-208956

[51] Int. Cl.⁶ .............................................. A23J 1/09
[52] U.S. Cl. ................................ 99/500; 99/497
[58] Field of Search ....................... 99/495–500, 99/568, 577–582; 426/490, 614, 478–480

[56] References Cited

U.S. PATENT DOCUMENTS

| | | | |
|---|---|---|---|
| 2,060,683 | 11/1936 | Mohr | 99/500 |
| 2,523,777 | 9/1950 | Polcar | 99/499 |
| 4,534,284 | 8/1985 | Fujimura et al. | 99/498 |
| 4,541,330 | 9/1985 | Fujimura | 99/497 |
| 4,811,111 | 9/1987 | Willsey | 99/499 |

Primary Examiner—Timothy F. Simone
Attorney, Agent, or Firm—Michael D. Bednarek; Marks & Murase

[57] ABSTRACT

A yolk cup is provided for use in an egg breaking apparatus. The yolk cup is pivotable between a substantially horizontal position and an inclined position. In the horizontal position, the yolk cup receives an egg content including a yolk and an albumen, the yolk cup being provided with a discharge cutout for selectively discharging the albumen while retaining the yolk when the yolk cup is held in the horizontal position. The discharge cutout comprises an upper yolk discharge portion extending up to an upper brim of the yolk cup for discharging the yolk when the yolk cup is pivoted to the inclined position, and a pair of lower albumen discharge portions continuous with the yolk discharge portion at both sides thereof.

6 Claims, 6 Drawing Sheets

YOLK CUP FOR EGG BREAKING APPARATUS

BACKGROUND OF THE INVENTION

1. Field of the Invention

This invention relates to a yolk cup which can be advantageously incorporated in an automatic egg breaking apparatus. More specifically, the present invention relates to a yolk cup of the type which receives the content of an automatically broken egg and separately discharges the yolk and albumen of the egg content.

2. Description of the Prior Art

As is well known, eggs have found wide use. For example, the egg yolk may be used as a material for making mayonnaise or other food products. The egg white (albumen) may be used for making pharmaceutical products or as a binder for protein products. Due to such wide use of the egg, it is absolutely necessary in industry to use an automatic egg breaking apparatus for breaking eggs and taking out their contents at high speed. Further, since the two different parts of the egg content have different applications, it is also necessary to automatically separate the yolk and albumen.

U.S. Pat. No. 4,111,111 to Willsey discloses a cup assembly used in an automatic egg breaker for separating the content of an automatically broken egg. More specifically, the cup assembly comprises an upper yolk cup (separating cup) and a lower albumen cup. The yolk cup has a V-shaped groove at a front portion of the yolk cup, and a separate slot at a rear portion of the yolk cup. When the yolk cup receives the egg content, the egg albumen is discharged gravitionally through the V-shaped groove and through the slot for falling into the lower albumen cup while retaining the egg yolk. Further, the yolk cup is pivotable to assume a laterally inclined position for discharging the egg yolk over the top brim of the yolk cup.

According to the prior art arrangement described above, the V-shaped groove is used only for selectively discharging the egg albumen, and the egg yolk is discharged over the top brim of the yolk cup by laterally pivoting the yolk cup. Thus, it is necessary to later pivot the albumen cup forwardly downward for discharging the albumen from the albumen cup. In other words, the egg yolk and the egg albumen must be discharged from the respective cups by two different pivotal movements with a time difference. As a result, the efficiency of the automatic egg breaker as a whole becomes relatively low.

It is conceivable to use the V-shaped groove also for discharging the egg yolk by pivoting the yolk cup forwardly downward without prior lateral pivoting. In this case, however, the yolk sac is likely to be damaged by coming into rubbing contact with the edges of the V-shaped groove.

SUMMARY OF THE INVENTION

It is, therefore, an object of the present invention to provide a yolk cup which is capable of efficiently separating the yolk and albumen of an egg content in a short time.

The present invention also seeks to provide a yolk cup which can discharge the yolk of an egg content with less likelihood of damaging the yolk.

According to the present invention, there is provided a yolk cup for an egg breaking apparatus, the yolk cup being pivotable between a substantially horizontal position and an inclined position, the yolk cup in the horizontal position receiving an egg content including a yolk and an albumen, the yolk cup being provided with a discharge cutout for selectively discharging the albumen while retaining the yolk when the yolk cup is held in the horizontal position, wherein the discharge cutout comprises an upper yolk discharge portion extending up to an upper brim of the yolk cup for discharging the yolk when the yolk cup is pivoted to the inclined position, and a pair of lower albumen discharge portions continuous with the yolk discharge portion at both sides thereof.

Preferably, the albumen discharge portions of the discharge cutout may extend obliquely downwardly away from each other. Further, the yolk discharge portion of the discharge cutout may be generally rectangular.

According to a preferred embodiment of the present invention, the upper brim of the yolk cup is substantially circular, and the yolk discharge portion of the discharge cutout has a minimum width which is ¼ to ½ of the diameter of the upper brim. Further, the respective albumen discharge portions of the discharge cutout are separated from each other by an upwardly convex arcuate bottom edge, whereas each of the respective albumen discharge portions of the discharge cutout is partially defined by a downwardly convex arcuate end edge. Similarly, the yolk discharge portion of the discharge cutout is defined by a pair of inwardly convex curved side edges.

Other objects, features and advantages of the present invention will become apparent from the following detailed description of the preferred embodiments given with reference to the accompanying drawings.

DETAILED DESCRIPTION OF THE PREFERRED EMBODIMENT

Figure 1:
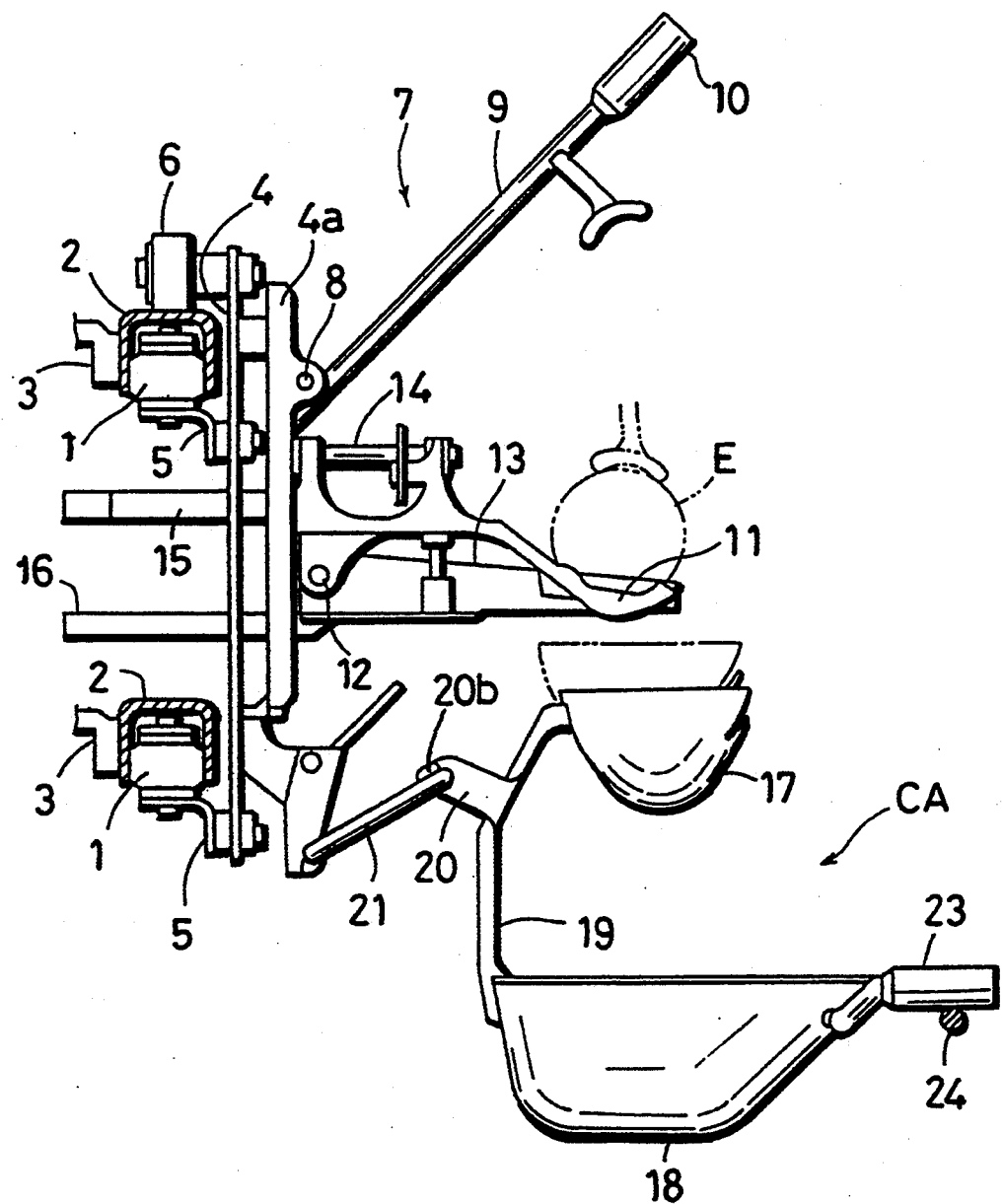
FIG. 1 is a side view schematically showing a cup assembly according to an embodiment of the present invention together with an associated egg breaking mechanism.

Referring first to FIG. 1 of the accompanying drawings, there is shown a vertically spaced pair of endless chains 1 which is held in engagement with a sprocket assembly (not shown) for movement along a predetermined travel path. The pair of endless chains 1 is slidably received by guide rails 2 which are fixed to an unillustrated machine base via mounting lugs 3 and other support elements (not shown).

Each of the guide rails 2 is a channel member which is downwardly open for receiving a corresponding one of the chains 1. Each of the chains 1 is fixedly connected to a plurality of holders 4 (only one shown) by means of angle plates 5 as suitably spaced along the chain travel path. Each of the holders 4 has an upper end provided with a roller 6 which rolls on the upper one of the guide rails 2.

Each of the holders 4 removably carries an egg breaking mechanism 7 which comprises a mechanism mount 4a. The egg breaking mechanism 7 further comprises an egg presser 9, an egg receiver 11, and a knife assembly 13.

The egg presser 9 functions to downwardly press an egg E against the egg receiver 11 for holding. For this purpose, the egg presser 9 is pivotally connected to the mechanism mount 4a by means of a horizontal shaft 8, and has a follower end portion 10 slidably guided by a cam track (not shown) for controlling the pivotal movement of the egg presser 9.

The egg receiver 11 has a pair of receiver members (only one shown) pivotally supported on a common central shaft 14 extending perpendicularly from the mechanism mount 4a. The operation of each receiver member is controlled by a follower rod 15 guided by a cam track (not shown).

The knife assembly 13 comprises a pair of knife members (only one shown) each pivotally connected to a corresponding receiver member 11 by means of a horizontal pin 12. The operation of each knife member is controlled by another follower rod 16 guided by a cam track (not shown).

In operation, the egg breaking mechanism 7 breaks the egg E as it moves along the travel path of the endless chains 1. The operation of the egg breaking mechanism 7 (namely, the egg presser 9, the egg receiver 11 and the knife assembly 13) is controlled by the unillustrated cam tracks, as described previously. It should be appreciated that the egg breaking mechanism 7 itself does not form the subject of the present invention, so that further details of the egg breaking mechanism 7 will not be described herein.

As also shown in FIG. 1, each of the holders 10 also carries a cup assembly CA removably by means of a mounting assembly 22. The cup assembly includes an upper yolk cup 17, a lower albumen cup 18, and a cup mount 19. The yolk cup 17 incorporated in the cup assembly CA of FIG. 1 constitutes a feature of the embodiment of the present invention.

The cup mount 19 is generally bow-shaped or bent at an obtuse angle. The cup mount 19 has an upper mounting end for attachment to the yolk cup 17, and a lower mounting end for attachment to the albumen cup 18. The attachment of the respective cups 17, 18 may be performed by welding for example.

Figure 6:
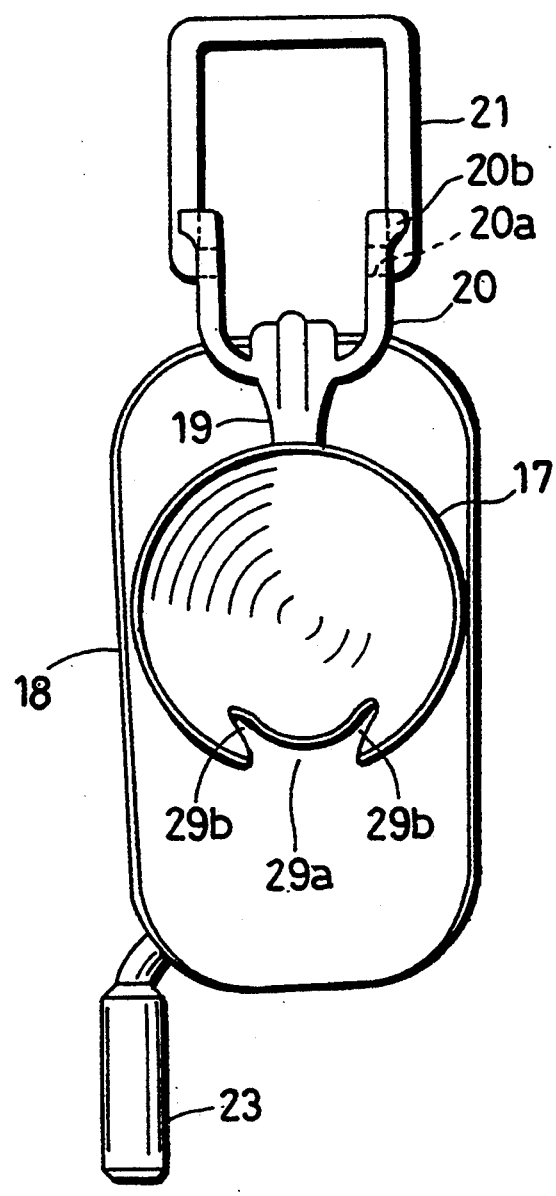
FIG. 6 is a plan view showing the cup assembly.
Figure 7:
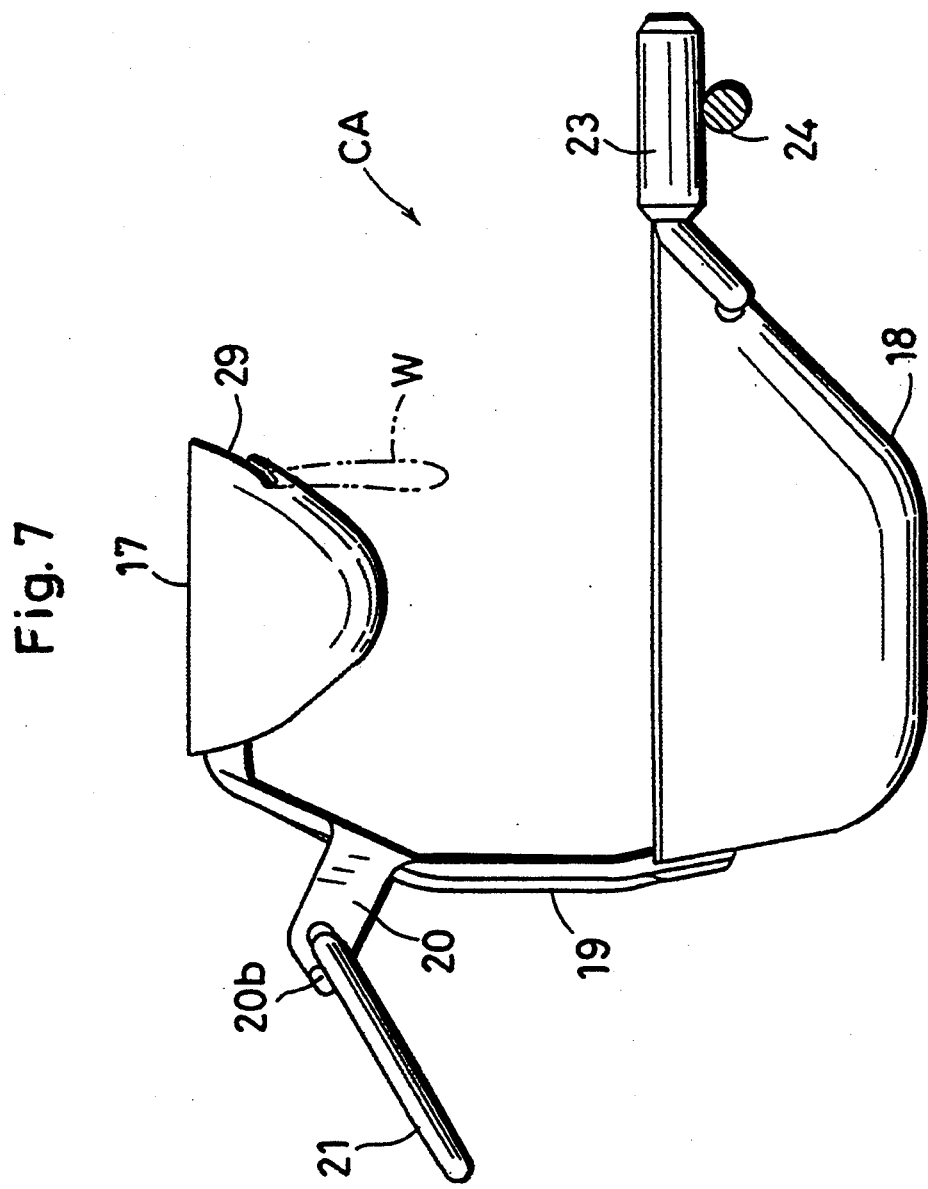
FIG. 7 is a side view showing the cup assembly.

As shown in FIGS. 1, 6 and 7, an intermediate portion of the cup mount 19 is integrally formed with a pair of stays 20 projecting obliquely rearward and upward. Each of the stays 20 has a mounting hole 20a for pivotal connection to a pivotal prop 21, and a stopper projection 20b directed laterally outward for abutment with the prop 21 from above.

The yolk cup 17 receives the content of the egg E which has been broken by the egg breaking mechanism 7 above. The yolk cup 17 has an additional function of selectively allowing the egg white portion (albumen) to fall down to the albumen cup 18 while retaining only the egg yolk portion, as described in detail hereinafter.

The albumen cup 18 attached to the lower mounting end of the cup mount 19 is generally in the form of a bath tub. Being located immediately under the yolk cup 17, the albumen cup 18 receives the egg white separated at the yolk cup 17. The albumen cup 18 has a front portion welded to a control rod 23 in sliding contact with a cam track member 24 for controlling the position and inclination of the cup assembly 7.

Figure 2:
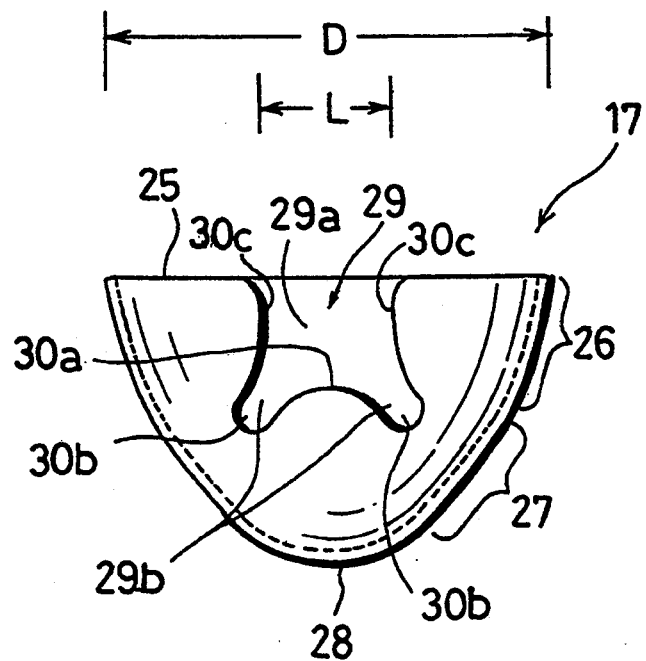
FIG. 2 is an enlarged front view showing a yolk cup incorporated in the same cup assembly.
Figure 3:
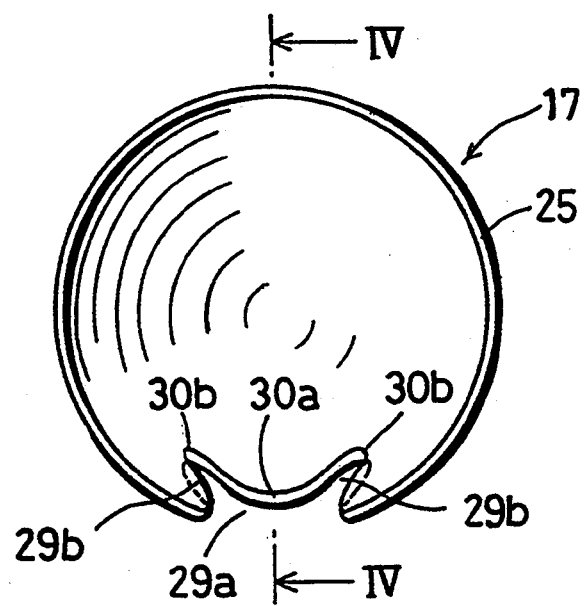
FIG. 3 is a plan view of the yolk cup.

As more specifically shown in FIGS. 2 through 7, the upper yolk cup 17, which may be an integral body made of stainless steel or synthetic resin, has a brim 25 which is an upwardly directed circular edge with a diameter D (FIG. 2). If desired, the brim 25 may be bent outwardly to have a rounded inner corner. Such a rounded brim is effective for preventing breakage of the yolk sac (vitelline membrane) even if the egg yolk impinges the cup brim 25. Alternatively, the brim 25 may be otherwise rounded.

As seen in FIG. 2, the body of the yolk cup 17 has a rounded upper portion 26 extending from the brim 25. Further, the yolk cup 17 also has a frustoconical albumen squeezing intermediate portion 27 continuous with the upper portion 26, and a partially spherical bottom portion 28 continuous with the intermediate portion 27.

Figure 4:
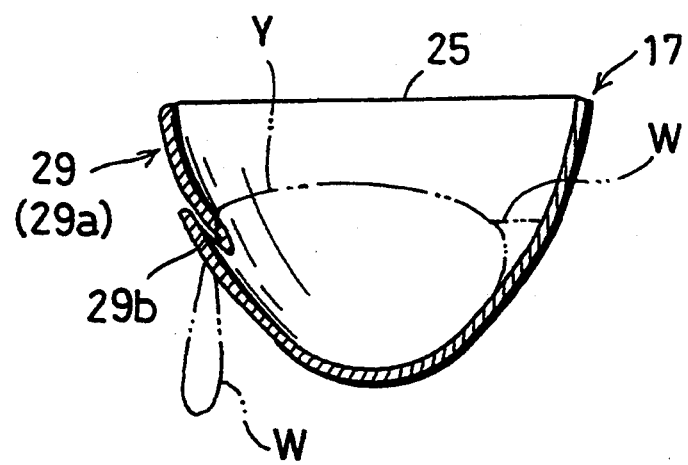
FIG. 4 is a sectional view taken along lines IV—IV in FIG. 3.
Figure 5:
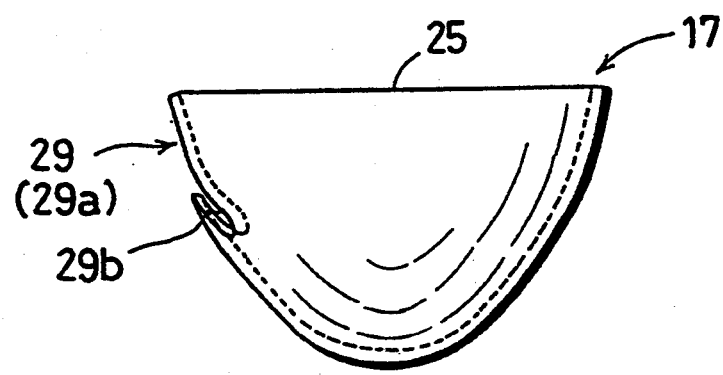
FIG. 5 is a side view of the yolk cup.

The rounded upper portion 26 of the yolk cup 17 tapers cross-sectionally toward the intermediate portion 27, but has a minimum cross section which is larger than the cross section of the egg yolk Y (see FIG. 4). The taper angle of the intermediate portion 27 is set such that almost all of the egg albumen W is squeezed out of the yolk cup 17 by pressing contact of the egg yolk Y with the intermediate portion 27 under the gravity of the egg yolk. The curvature of the bottom portion 28 is determined so that the egg yolk Y is supported stably thereon.

The yolk cup 17 is formed with a forwardly open discharge cutout 29 which includes an upper yolk discharge portion 29a and a pair of lower albumen discharge portions 29b continuous with the upper yolk discharge portion 29a.

According to the illustrated embodiment, the yolk discharge portion 29a of the discharge cutout 29 is generally square (or rectangular) with a minimum width L which is about ⅓ of the diameter D of the cup brim 25. Experiments have revealed that the minimum with L of the yolk discharge portion 29a may be preferably in the range of ¼ to ½ of the cup brim diameter D for smoothly and quickly discharging the egg yolk Y (FIG. 4). In addition to being sufficiently wide, the yolk discharge portion 29a extends vertically all the way up to the cup brim 25, so that the yolk discharge portion 29a is capable of reliably discharging the yolk Y even if the size of the yolk is relatively large.

The respective albumen discharge portions 29b of the discharge cutout 29 extends obliquely downwardly away from each other. Such a configuration is preferred in that the albumen discharge portions 29b are not closed by the egg yolk Y, thereby enabling unobstructed discharge of the albumen W. Further, the use of the two albumen discharge portions additionally speeds up discharge of the albumen W.

According to the illustrated embodiment, the discharge cutout 29 includes three distinct kinds of curved edges, namely an upwardly convex arcuate bottom edge 30a, a pair of downwardly convex arcuate end edge 30b, and a pair of inwardly convex curved side edges 30c. Apparently, the arcuate bottom edge 30a and the curved side edges 30c are effective for discharging the egg yolk Y (FIG. 4) without damaging the yolk sac (vitelline membrane), whereas the arcuate end edges 30b are effective for quick discharge of the egg albumen W.

Figure 8:
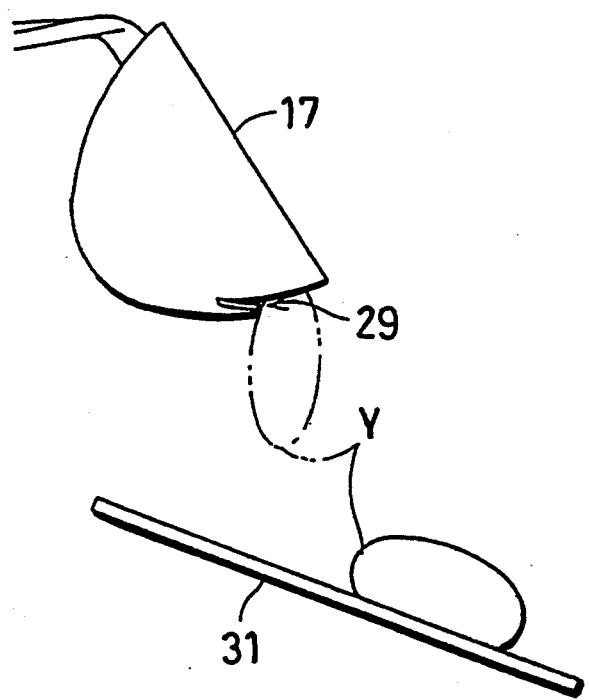
FIG. 8 is a side view showing the yolk cup of the same cup assembly at the time of discharging the yolk portion of the egg.

As shown in FIG. 7, the egg albumen W received in the yolk cup 17 is discharged through the respective albumen discharge portions 29b of the discharge cutout 29 to fall into the albumen cup 18 while the yolk cup 17 is held substantially horizontal. Of course, part of the egg albumen W may be discharged over the arcuate bottom edge 30a. On the other hand, as shown in FIG. 8, when the yolk cup 17 is forwardly tilted, the egg yolk Y is discharged through the yolk discharge portion 29a onto a yolk guide plate 31 for collection at an yolk collector (not shown).

The preferred embodiment of the present invention being thus described, it is obvious that the same may be varied in many ways. For instance, the yolk cup 17 may be incorporated in a differently designed cup assembly and/or combined with a differently designed egg breaking mechanism. Further, the discharge cutout 29 may be formed at a side portion of the yolk cup 17 in case the yolk cup 17 is tilted sidewise for discharging the egg yolk. Such variations are not to be regarded as a departure from the spirit and scope of the the invention, and all such variations as would be obvious to those skilled in the art are intended to be included within the scope of the following claims.

I claim:

1. A yolk cup for an egg breaking apparatus, the yolk cup being pivotable between a substantially horizontal position and an inclined position, the yolk cup comprising:

an upper brim; and a discharge cutout which comprises an upper yolk discharge portion extending up to the upper brim, and a pair of lower albumen discharge portions continuous with the yolk discharge portion at both sides thereof;

wherein the albumen discharge portions of the discharge cutout extend obliquely downwardly away from each other; and wherein the upper yolk discharge portion comprises a pair of inwardly convex, smoothly curved side edges to become wider immediately above the albumen discharge portions and narrower adjacent to the upper brim of the yolk cup.

2. The yolk cup according to claim 1, wherein the yolk discharge portion of the discharge cutout is generally rectangular.

3. The yolk cup according to claim 1, wherein the upper brim of the yolk cup is substantially circular, the yolk discharge portion of the discharge cutout having a minimum width which is $\frac{1}{4}$ to $\frac{1}{2}$ of the diameter of the upper brim.

4. The yolk cup according to claim 1, wherein the respective albumen discharge portions of the discharge cutout are separated from each other by an upwardly convex arcuate bottom edge.

5. The yolk cup according to claim 1, wherein each of the respective albumen discharge portions of the discharge cutout is partially defined by a downwardly convex arcuate end edge.

6. The yolk cup according to claim 1, wherein the yolk cup has a cup wall which includes a partially spherical upper portion cross-sectionally reducing downwardly, a frustoconical intermediate portion cross-sectionally reducing downwardly from the upper portion for squeezing out the albumen, and a partially spherical bottom portion cross-sectionally reducing downwardly from the intermediate portion for stably supporting the yolk.

* * * * *